United States Patent [19]

Storz

[11] 4,102,333
[45] Jul. 25, 1978

[54] HEAD MOUNTED LAMP WITH JOINT OBSERVATION EYEPIECE

[76] Inventor: Karl Storz, Auf dem Schildrain 29, 7200 Tuttlingen, Fed. Rep. of Germany

[21] Appl. No.: 773,017

[22] Filed: Feb. 28, 1977

Related U.S. Application Data

[63] Continuation of Ser. No. 615,789, Sep. 22, 1975, abandoned.

[30] Foreign Application Priority Data

Jul. 11, 1975 [DE] Fed. Rep. of Germany ....... 2530939

[51] Int. Cl.² .............................................. A61B 1/06
[52] U.S. Cl. ........................................... 128/6; 128/22
[58] Field of Search ..................................... 128/4–11, 128/21–23

[56] References Cited

U.S. PATENT DOCUMENTS

| 1,551,770 | 9/1925 | Palmeter | 128/6 |
| 1,640,096 | 8/1927 | Rosenstein | 128/7 |
| 2,088,735 | 8/1937 | Everhards | 128/22 |
| 2,517,422 | 8/1950 | Gellman | 128/22 |
| 2,699,770 | 1/1955 | Fourestier et al. | 128/6 |
| 3,067,648 | 12/1962 | Cohen | 128/4 X |
| 3,745,993 | 7/1973 | Feinbloom | 128/23 |

FOREIGN PATENT DOCUMENTS

| 1,304,682 | 8/1962 | France | 128/23 |
| 1,290,660 | 3/1969 | Fed. Rep. of Germany | 128/6 |
| 953,737 | 12/1956 | Fed. Rep. of Germany | 128/6 |

OTHER PUBLICATIONS

Zielinski, et al.; "An Endoscopic Side-Viewer"; The Lancet; Apr. 27, 1963; pp. 924–925.
Millichamp; "Microscopes for Looking into Holes"; Engineering, vol. 210, No. 5438; Jul. 24, 1970; p. 101.

*Primary Examiner*—Clifford D. Crowder
*Attorney, Agent, or Firm*—Eugene M. Eckelman

[57] ABSTRACT

A concave mirror is mounted on a head band and is associated with a light source for lighting an area to be inspected for medical purposes. A support for the mirror has a viewing path in which is incorporated a prism which is constructed to have a main viewing path for use by the person wearing the head band and to have a branch path for viewing by a second person. A viewing tube and eyepiece is secured to the support for viewing the branch path of the prism, and such tube is of sufficient length to allow convenient viewing by the second person.

2 Claims, 3 Drawing Figures

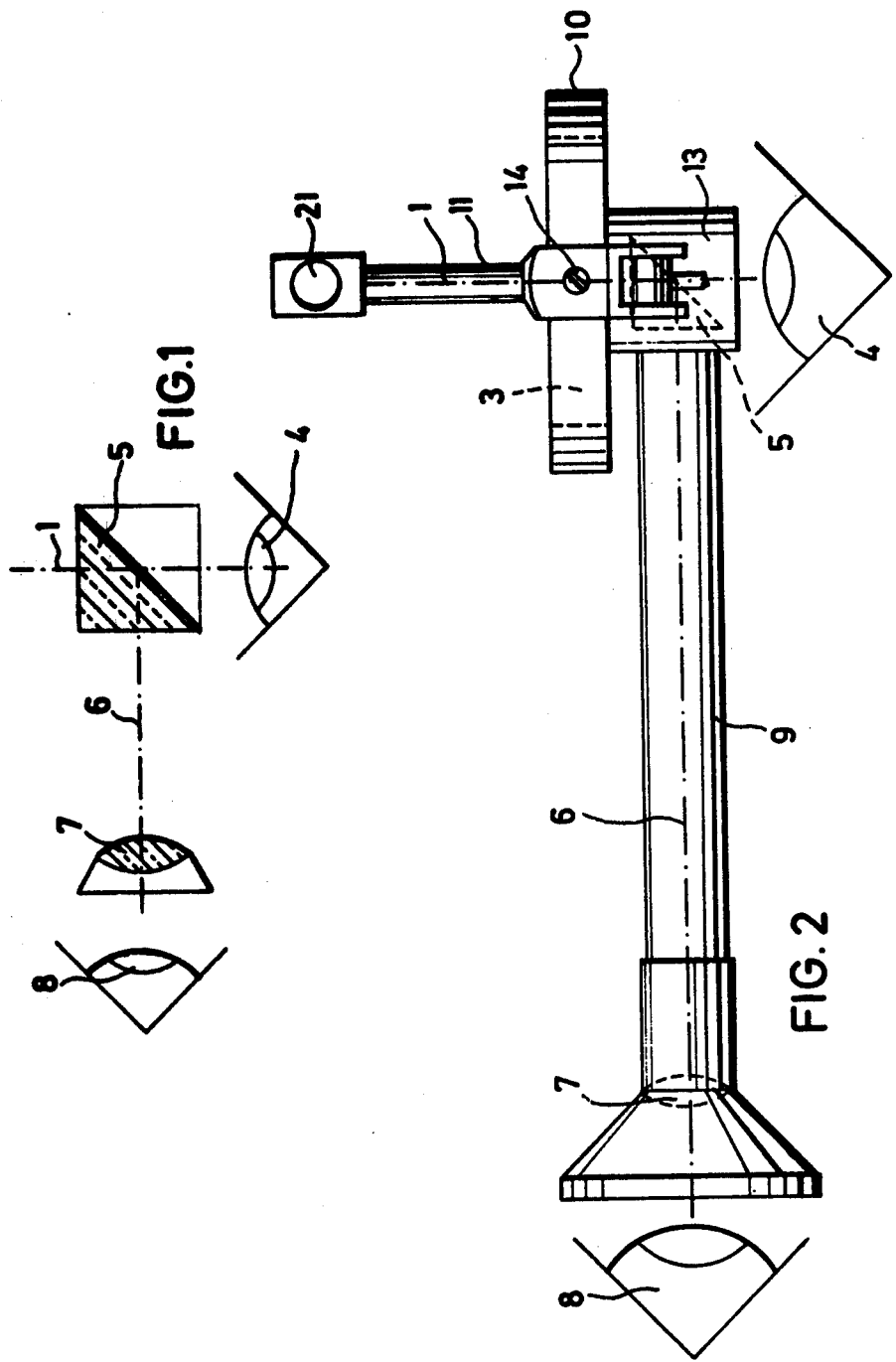

HEAD MOUNTED LAMP WITH JOINT OBSERVATION EYEPIECE

This is a continuation of application Ser. No. 615,789, filed 9/22/75 now abandoned.

BACKGROUND OF THE INVENTION

The present invention relates to a head-lamp, particularly for medical purposes, with a head band and a concave mirror movably arranged thereon with a viewing slit for the observing doctor and to which is mounted a joint observation eyepiece and a lighting circuit for illuminating the concave mirror.

Known head-lamps of this type are, for example, used in operations on the nasal cavity for concentrating, by means of a concave mirror, light supplied via a fiberglass lighting circuit onto the point where the operation is taking place. Nowadays such head-lamps are relatively small and are therefore often called miniature head-lamps, whereby for the beam path of the observing doctor the said viewing slit is provided at the lower end of the concave mirror. The use of the above-indicated flexible fiberglass lighting circuit provides the advantage that despite its small size and limited weight large light intensities can be obtained.

It has long been conventional practice with medical endoscopes to use an optical system with at least one semi-transparent prism, permitting the passage of 50% of the radiation, wilst deflecting the remaining 50% into the said optical system for a second observer, who can then also observe the operation or the like. Joint observation systems of this type are also used for training, so that the trainee doctor or student can also observe the operation.

However, joint observation has not hitherto been possible in the case of operations in the nasal cavity when these had to be performed with head-lamp illumination. Therefore, the corresponding construction is made more difficult.

SUMMARY OF THE INVENTION

The object of the present invention is to eliminate this disadvantage and provide the possibility of joint observation when using the head-lamp.

According to the general inventive concept an optical system for a second observer is provided on the head-lamp.

According to the invention this problem is solved with a head-lamp of the type indicated hereinbefore by providing a semi-transparent prism in the beam path of the concave mirror viewing slit for the observing doctor, by means of which a branched beam path is passed to a second observer eyepiece.

As a result it is possible for one or several observers to follow the operation at relatively low cost, whereby the joint observer can stand at an angle to the observing doctor. Since, as indicated hereinbefore, the light intensity can be very large with the indicated means, it can be kept completely adequate for two people if 50% of the radiation is passed through the semi-transparent prism and the remaining 50% is branched off for the joint observer.

According to a further development of the invention the semi-transparent prism together with the tube for the branched beam path is provided on the mounting support for the concave mirror. As a result the concave mirror and tube for the joint observer form a compact unit of relatively simple construction.

Further advantages and details of the invention can be gathered from the following description of an embodiment with reference to the drawings.

BRIEF DESCRIPTION OF THE DRAWINGS

FIG. 1 is a schematic view of the beam path of the instant invention;

FIG. 2 is a plan view of the invention without the lighting circuit; and

DETAILED DESCRIPTION OF A PREFERRED EMBODIMENT

Figure 3:
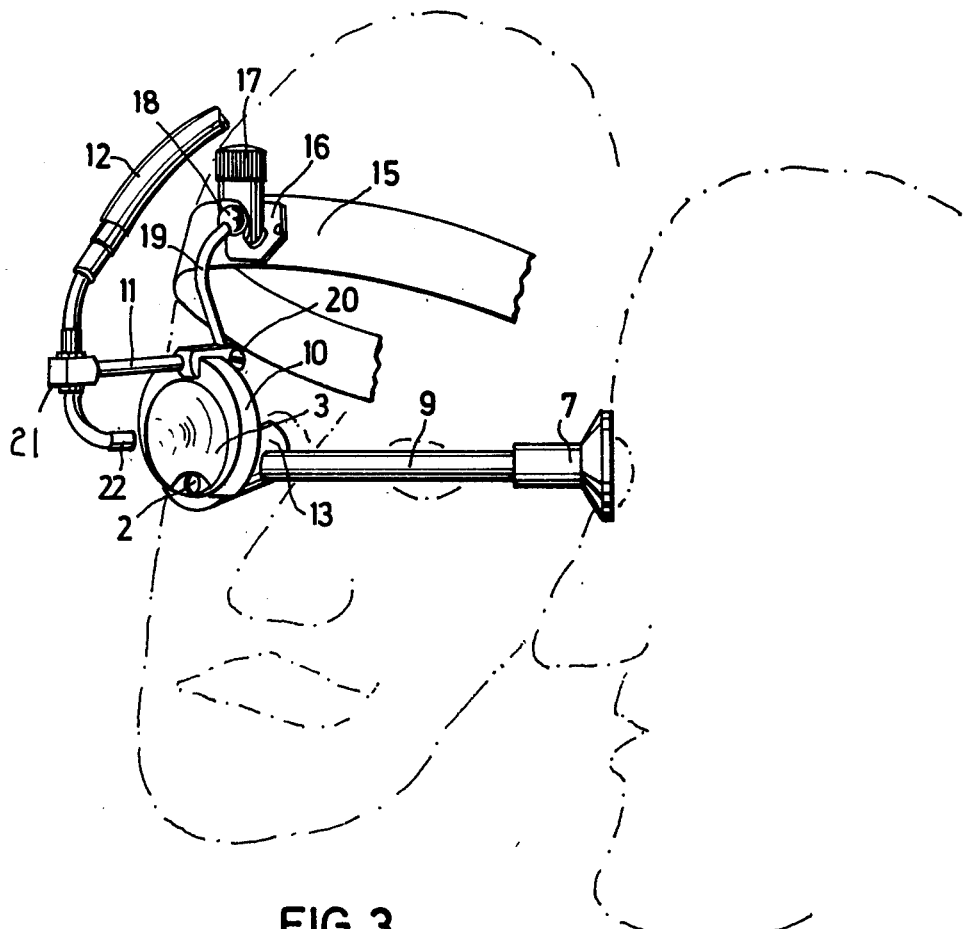
FIG. 3 is a perspective view of the invention when in use.

FIG. 1 schematically shows the beam path 1 of the head-lamp according to the invention. For reasons of clarity the light source with the concave mirror have not been shown. The concave mirror is positioned approximately at the same height as the semi-transparent prism, as will be explained hereinafter.

For example, 50% of the beam path 1 coming from the object passes through the semi-transparent prism 5 and reaches the eye 4 of the observing doctor. Part, e.g. the remaining 50% of the radiation, is deflected at a right angle to the left and forms the beam path 6 which passes through the eyepiece 7 to the eye 8 of the joint observer. As can be seen as a result of this arrangement the eye 8 of the joint observer is at an angle to the eye 4 of the operating doctor.

FIG. 2 in particular shows that the mounting support 10 for concave mirror 3 is constructed in one piece with the housing 13 for the semi-transparent prism 5. To the left of housing 13 is connected tube 9 for the branched off beam path 6 which reaches the eye 8 of the joint observer via eyepiece lens 7.

At the upper end of mounting support 10 for concave mirror 3 is provided a further holder 11 for fiberglass rod lighting circuit 12, not shown in FIG. 2 so that reference should be made to FIG. 3.

By means of a screw 14, holder 11 is screwed to mounting support 10 for concave mirror 3.

FIG. 3 shows the overall arrangement. To the head of the observing doctor is attached the head band 15 to the front of which is fixed a holder 16 having a ball and socket joint 18 securable by means of a screw cap 17. Movable ball and socket joints of this type are known per se and need not therefore be explained in detail. Ball and socket joint 18 is connected with an arm 19 which is connected by means of an articulation 20 with holder 11, which by means of the screw 14 is screwed to mounted support 10 for concave mirror 3. Holder 11 extends forward and receives the lighting circuit 12 in a ring 21, see FIG. 2. The lower end 22 of lighting circuit 12 is directed onto concave mirror 3, so that light from there can be readily collected by the mirror.

A viewing slit 2 for the beam path or passageway 1 of the observing doctor is provided at the bottom on mirror 3 and on mounting support 10. Behind slit 2 are located housing 13 and tube 9, to which reference was made hereinbefore.

The invention is not limited to the represented embodiment. In particular, additional and different lenses can be arranged in beam path 1 or can be associated with beam path 6, as the skilled expert will be aware from similar joint observation systems for endoscopes.

It is also possible to provide a second additional joint observer beam path through using a further semi-transparent prism.

Having thus described my invention, I claim:

1. A head mounted lamp with joint observation eyepiece comprising
    (a) a head band arranged for removable support on a person's head,
    (b) a depending support secured on said head band for universal adjustment,
    (c) a mirror,
    (d) a prism,
    (e) an elongated housing having a mounting support provided at the forward end thereof,
    (f) said mirror positioned within said mounting support,
    (g) means securing said mounting support on a lower portion of said depending support for locating said mounting support and housing below said head band adjacent to one eye of the wearer,
    (h) lighting means on said depending support for illuminating said mirror,
    (i) means defining a single viewing passageway through said housing and mirror providing a viewing path which opens at the rear of said housing and which is arranged to be disposed at the eye of the wearer of the head band,
    (j) said prism in said housing disposed in said viewing path,
    (k) a tube secured at one of its ends adjacent to the end of said housing and projecting at approximately a right angle from said housing,
    (l) the interior of said tube at said one end communicating with the viewing path through said housing,
    (m) said prism having a branch viewing path extending through said tube,
    (n) and an eyepiece on the other end of said tube,
    (o) said tube being of a length sufficient such that a second person has a viewing location at the eyepiece on said tube out of the way of and at an angle to the person wearing the head band.

2. The head mounted lamp of claim 1 wherein said lighting means comprises a fiberglass rod.

* * * * *